No. 852,494. PATENTED MAY 7, 1907.
J. H. B. BRYAN.
MOLDING MACHINE.
APPLICATION FILED AUG. 23, 1902.
5 SHEETS—SHEET 2.
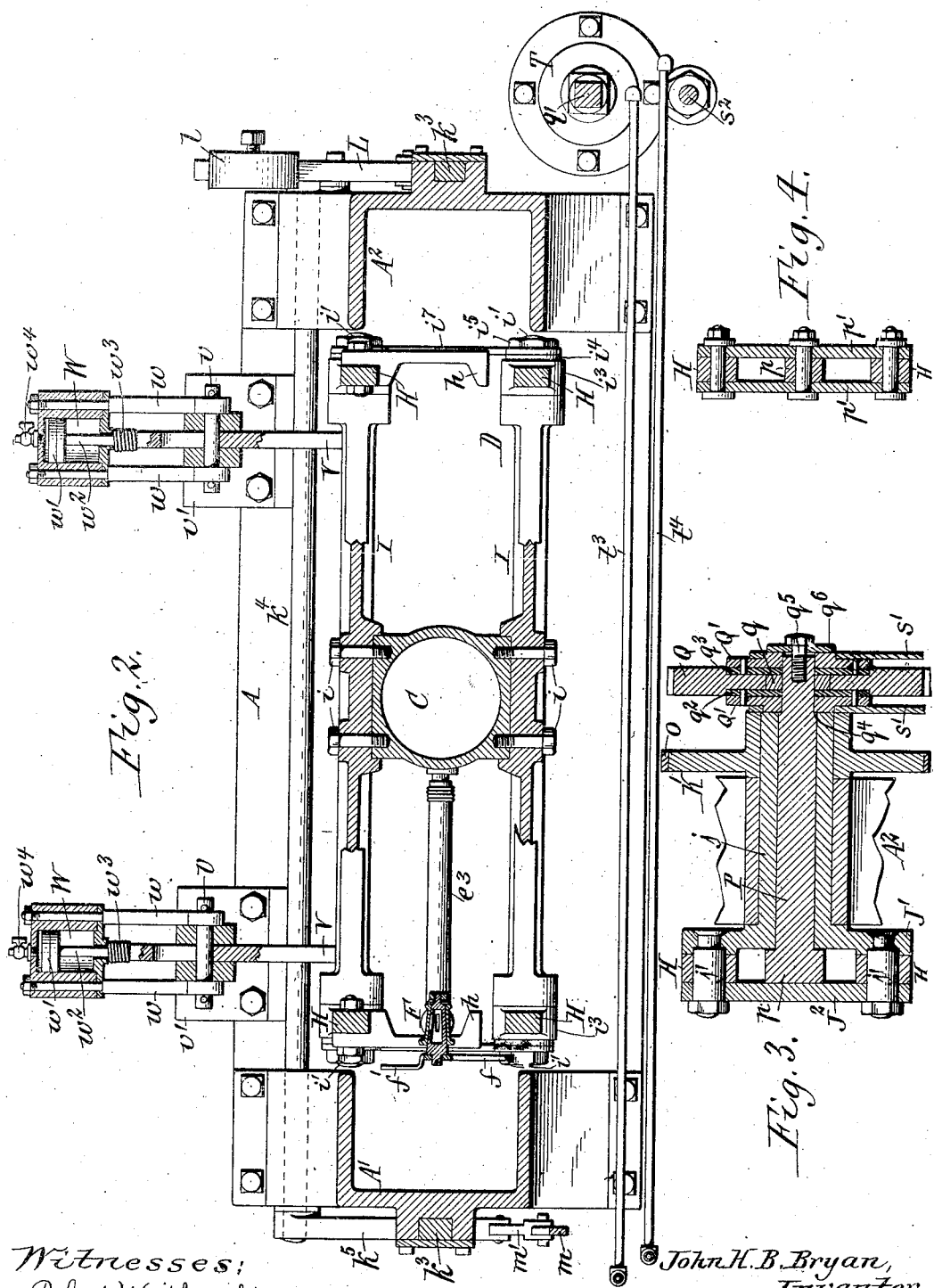
Witnesses:
Robert Weitknecht.
Emma M. Graham.
John H. B. Bryan,
Inventor
By Geyer & Popp
Attorneys.

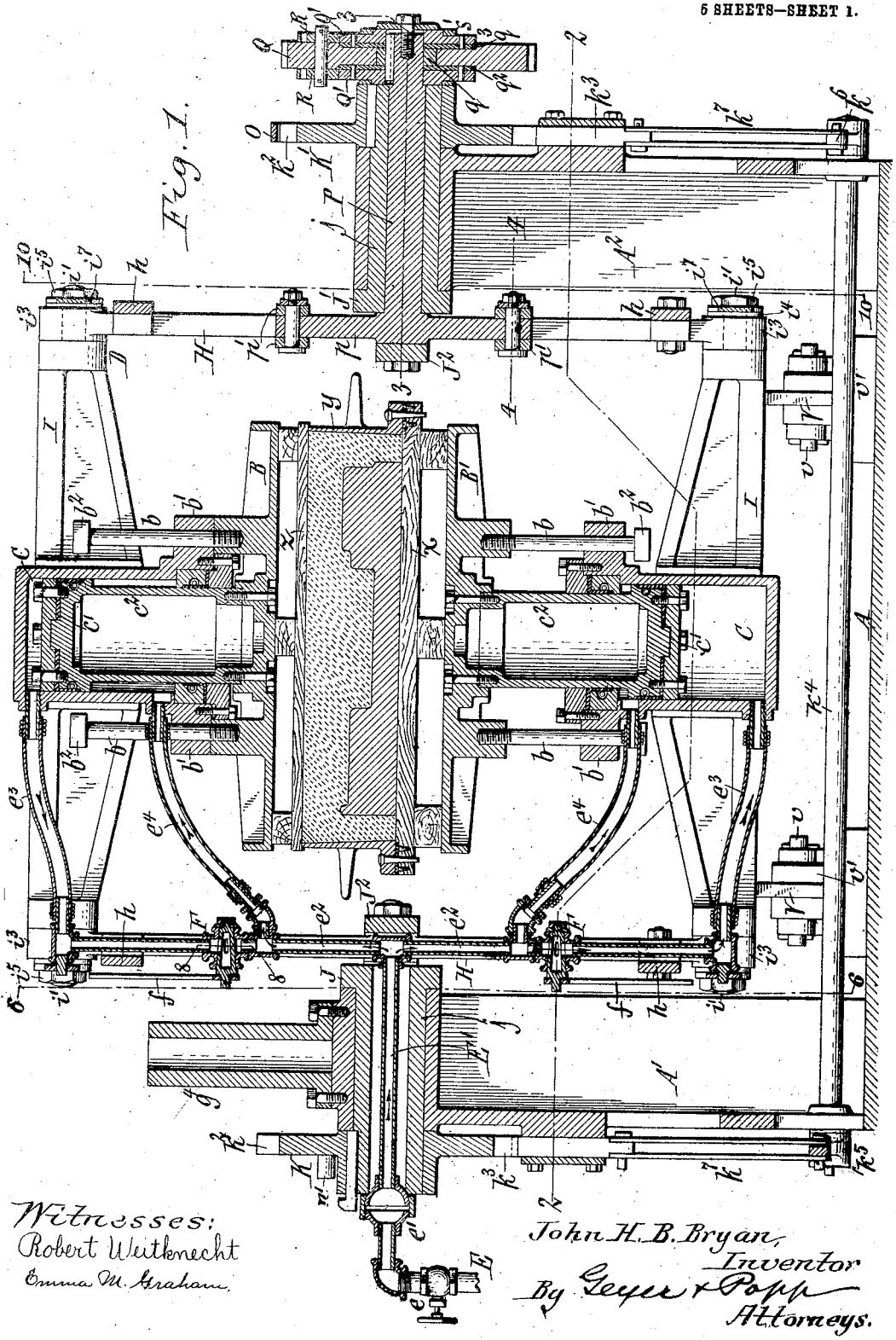

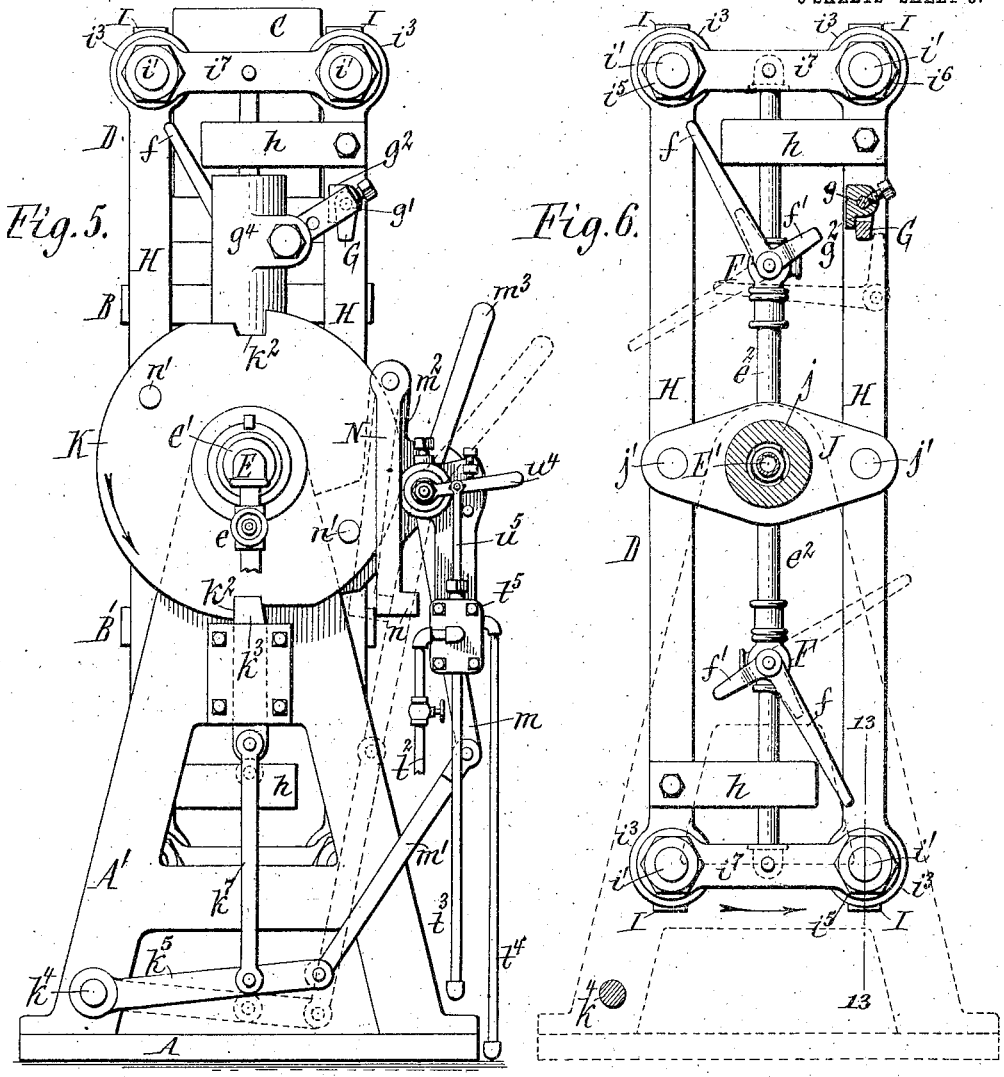

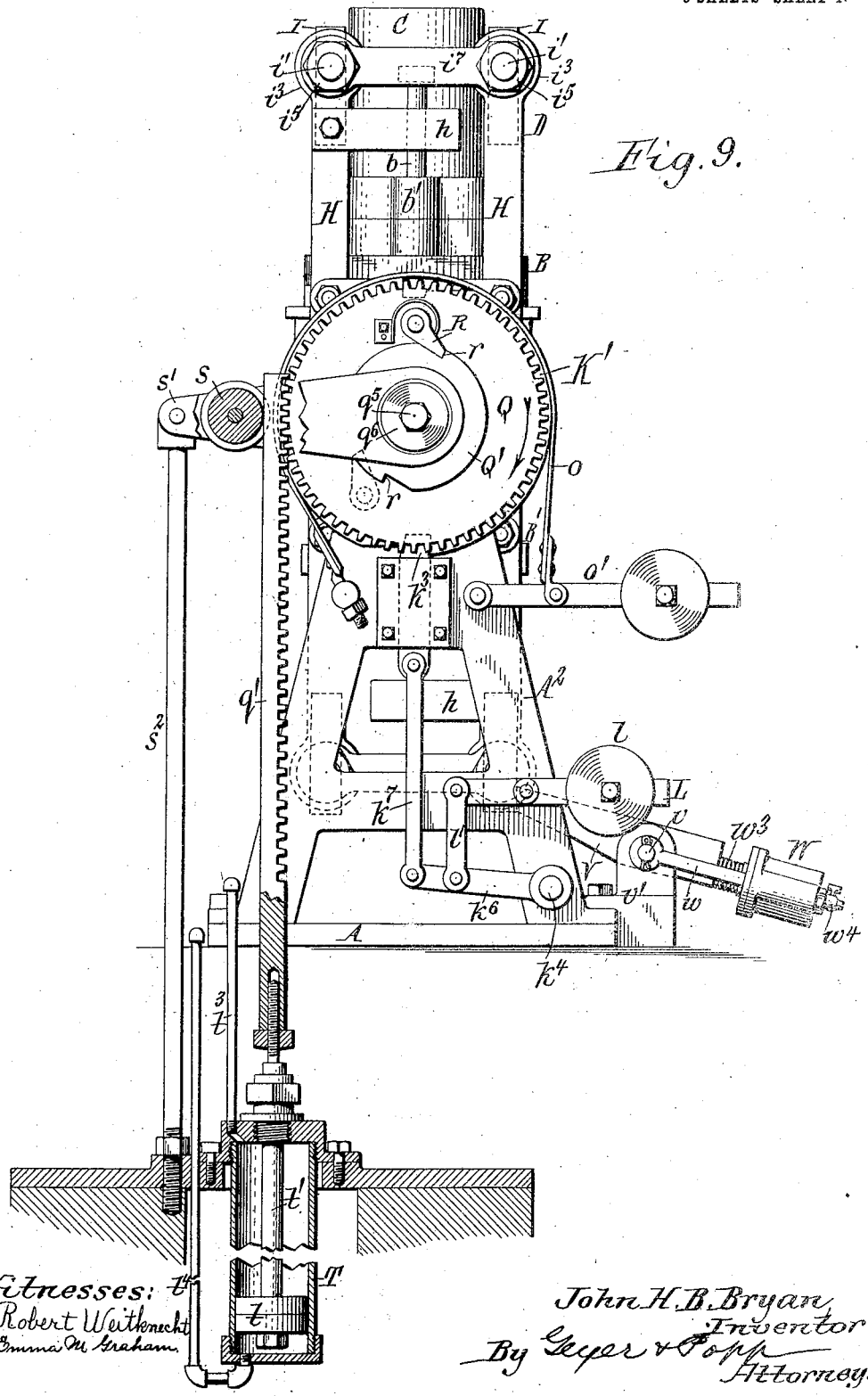

No. 852,494. PATENTED MAY 7, 1907.
J. H. B. BRYAN.
MOLDING MACHINE.
APPLICATION FILED AUG. 23, 1902.
5 SHEETS—SHEET 5.
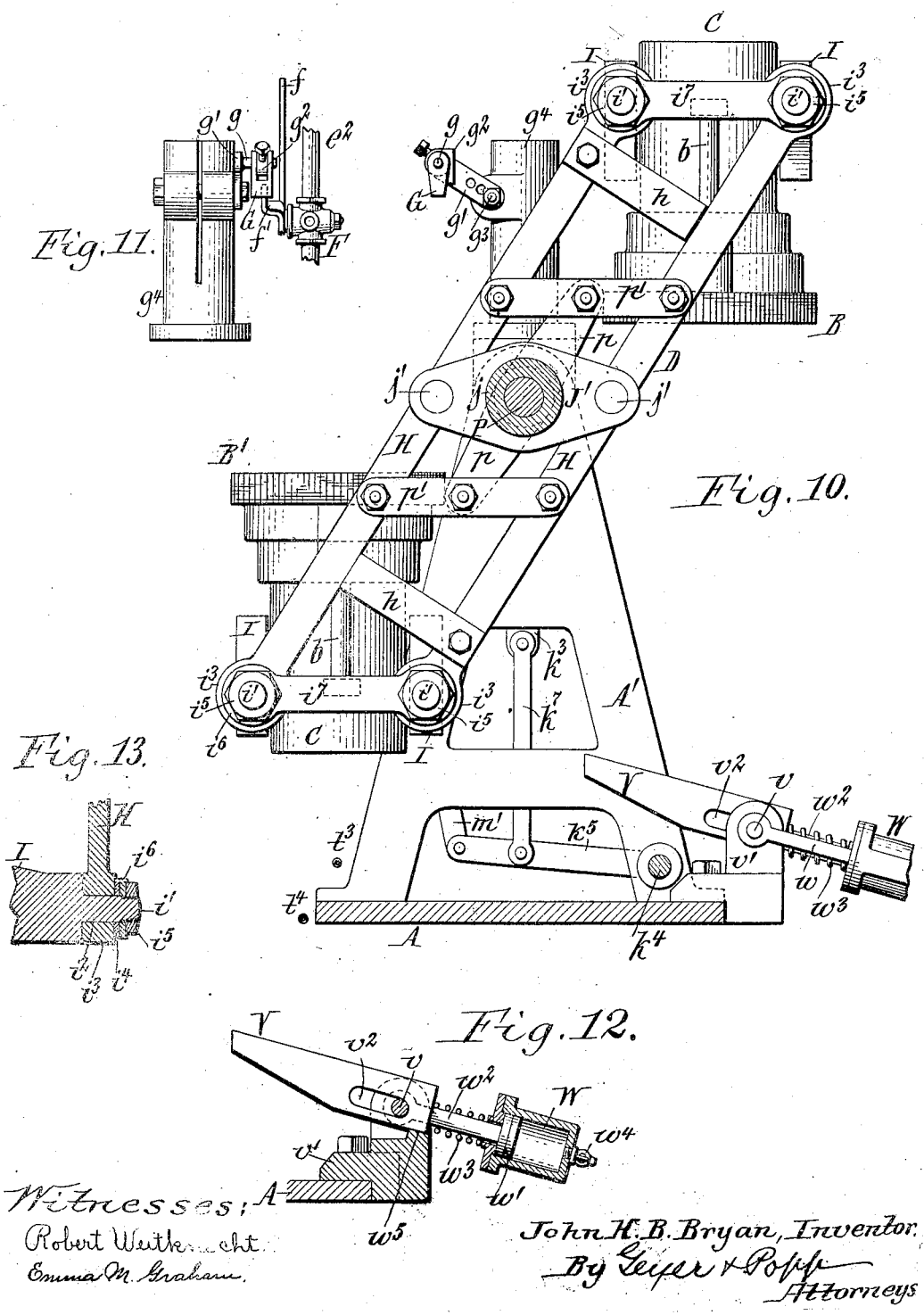

UNITED STATES PATENT OFFICE.

JOHN H. B. BRYAN, OF BUFFALO, NEW YORK, ASSIGNOR TO BRYAN VACUUM MOULDING MACHINE COMPANY, OF LOCKPORT, NEW YORK.

MOLDING-MACHINE.

No. 852,494.      Specification of Letters Patent.      Patented May 7, 1907.

Application filed August 23, 1902. Serial No. 120,753.

*To all whom it may concern:*

Be it known that I, JOHN H. B. BRYAN, a citizen of the United States, residing at Buffalo, in the county of Erie and State of New York, have invented new and useful Improvements in Molding-Machines, of which the following is a specification.

This invention relates to a molding machine which is more particularly designed for making molds in flasks of large size.

The object of this invention is the production of a machine for this purpose whereby the ramming and reversing of large molding flasks is readily and quickly effected by power, thereby avoiding the labor and loss of time incident to performing these operations manually.

In its general organization, this machine consists of two platens between which the mold is compressed, a pair of pneumatic rams which actuate the platens, and a rotatable support or carrier whereby the mold and the compressing mechanism may be reversed.

In the accompanying drawings: Figure 1 is a vertical longitudinal section of my improved molding machine. Figs. 2, 3 and 4 are horizontal sections in the correspondingly numbered lines in Fig. 1. Fig. 5 is an end elevation of the machine viewed from the left side. Fig. 6 is a vertical cross section in line 6—6, Fig. 1, viewed in the same direction as Fig. 5. Fig. 7 is a fragmentary front elevation of the machine, partly in section. Fig. 8 is a vertical section, on an enlarged scale, in line 8—8, Fig. 1, showing one of the pneumatic ram valves. Fig. 9 is an end elevation, partly in section, of the machine viewed from the right-hand side. Fig. 10 is a vertical cross section in line 10—10, Fig. 1, showing the position of the parts for receiving or delivering a molding flask. Fig. 11 is a front elevation of one of the pneumatic ram valves and its automatic shifting mechanism. Fig. 12 is a longitudinal section of one of the cushion stops whereby the backward movement of the flask supporting mechanism is limited. Fig. 13 is a fragmentary section in line 13—13, Fig. 6, showing one of the joints of the articulated reversible frame.

Similar letters of reference indicate corresponding parts throughout the several views.

The main frame of the machine consists essentially of a horizontal base A supported upon a suitable foundation and two standards or pedestals $A^1$, $A^2$ mounted upon opposite ends of the base.

Located above the base and between the standards are two platens B, $B^1$ arranged normally one above the other and adapted to receive a molding flask between them. These platens are movable toward and from each other for compressing the molding flask between the faces thereof, this movement being preferably effected by two pneumatic rams arranged on the outer side of the platens. Each of these rams consists of a pressure cylinder C, a piston $c^1$ arranged in the cylinder, and a hollow stem or neck $c^2$ connecting the inner side of the piston with the outer side of the adjacent platen and passing through a stuffing box or gland in the inner end of the cylinder. The inward movement of each platen is limited by means of stops which preferably consist of longitudinal rods $b$ guided in lugs $b^1$ on opposite sides of the cylinder and secured at their inner ends to the platen while their outer ends are provided with heads $b^2$ which engage with the outer sides of the lugs $b^1$. The pressure cylinders are mounted in a reversible frame D which turns in a vertical plane and whereby the molding flask may be reversed while held between the platens. Compressed air or other pressure medium for operating the pistons is conducted to the cylinders by supply conduits consisting of a stationary pipe E containing a valve $e$, a longitudinal pipe $E^1$ extending axially through one of the pivots of the reversible frame and connected at its outer end by a rotary joint $e^1$ with the stationary pipe, branch pipes $e^2$ extending laterally from the inner end of the longitudinal pipe, and flexible tubes $e^3$, $e^4$ connecting each branch pipe with opposite ends of one of the pressure cylinders. Each of the branch pipes is provided between its flexible tubes with a three-way valve F, whereby the outer end of the corresponding pressure cylinder may be connected either with the compressed air supply or with the atmosphere. The inner tubes leading to the inner ends of the pressure cylinders are valveless so that these ends of the cylinders are constantly in communication with the compressed air supply.

The outer side of each pressure piston is exposed over its entire area to the pressure of the compressed air upon admitting the same to this end of the cylinder, but the effective area on the inner side of the piston is smaller than that of the outer side of the piston, owing to the neck which connects the pressure piston with its companion platen and which reduces the area on this side of the piston. Upon turning an air valve F so as to admit air to the outer end of one of the pressure cylinders, the piston therein will be moved inwardly notwithstanding that there is a pressure of air against the inner side of the same, this movement being due to the differential in the areas of the inner and outer sides of the piston which causes the pressure against the outer end of the piston to preponderate over that against the inner side. Upon turning the air valve in the opposite direction so as to cut off the outer end of the cylinder from the air pressure and connect the same with the atmosphere, this end of the cylinder will be vented and permit the constant air pressure against the inner side of the piston to move the same outwardly. The rotary plug of each air valve F is provided on its outer side with an elbow lever for turning the valve either by hand to admit air into the outer end of the corresponding cylinder and for turning the same automatically to cut off the supply of air to the outer end of the cylinder and connect the same with the atmosphere. The two arms of this elbow-lever are arranged at right angles to each other or substantially so, the manual or handle-arm $f$ being quite long and the automatic or tappet arm $f^1$ comparatively short. Each of the air valves F is turned manually by its handle-arm when the piston which it controls is in the lower part of the machine for admitting air underneath this piston and causing the same to move its platen and the flask mounted thereon upwardly against the platen above the same. Upon reversing the mold and its supporting mechanism, the tappet arm $f^1$ engages with a valve stop G whereby its air valve is turned for cutting off the air supply from the outer end of the cylinder which is now uppermost, thereby permitting the same to be raised by the constant air pressure against the inner side of the same and lift its platen from the reversed flask. In order to permit of so arranging the valve stop G that the same will not be engaged by the handle arm of the air valve, the tappet arm is offset outwardly, as shown in Figs. 2 and 11. The valve stop G is mounted loosely at its upper bifurcated end on a pin $g$ projecting inwardly from a supporting bar $g^1$ and is free to swing backwardly, but its forward movement is limited by a shouldered collar $g^2$ which is fastened on the pivot pin $g$ within the divided part of the stop. During the forward rotary movement of the reversible frame in the direction of the arrow Fig. 6, the tappet-arm of the upwardly moving air valve strikes the stop G and this valve is turned sufficiently for cutting off the air supply to the outer end of the respective cylinder and connecting the same with the atmosphere. The position of the valve stop G is so adjusted that this operation of the air valve takes place just before the reversible frame completes a half-turn and before the reversed flask and pressure piston reaches the uppermost position. To permit of conveniently adjusting the position of the valve stop G, its supporting bar $g^1$ is adjustably connected with a stationary part of the machine, this being preferably accomplished by means of a screw bolt $g^3$ arranged on a post $g^4$ rising from the standard $A^1$ and passing through one of a series of openings in the supporting bar, as shown in Figs. 10 and 11. If the valve stop is struck by the tappet-arm while moving the reversible frame backwardly, the stop swings backwardly and permits the tappet-arm to clear the same, thereby avoiding injuring the parts.

The reversible frame D which carries the platens and their actuating mechanism is preferably constructed in the form of an articulated parallelogram, so that the same can be tilted or folded for the purpose of offsetting one platen from the other and permitting of conveniently placing the molding flasks in the machine and removing the same therefrom. As shown in the drawings, this reversible frame consists essentially of two pairs of normally vertical parallel bars H, H arranged at opposite ends of the platens and the pressure cylinders, two pairs of horizontal bars I, I arranged lengthwise on the outer sides of the platens, and two pivot heads J, $J^1$ pivotally supporting the vertical bars. Each of the pivot heads is provided centrally with an outwardly projecting horizontal trunnion $j$ which is journaled in a bearing at the upper end of the adjacent standard and on opposite sides of its trunnion with two horizontal pintles $j^1$, $j^1$ whereby the same is pivotally connected with the central parts of the adjacent pair of vertical bars H, H. The trunnions of both pivot heads are arranged horizontally in line and form the axis on which the reversible frame turns as a whole. The trunnion of the pivot head J is provided with an axial bore which receives the longitudinal section $E^1$ of the conduit whereby air is supplied to the pressure cylinders. The bars of each horizontal pair are arranged on opposite sides of one of the pressure cylinders and secured thereto by bolts $i$, as shown in Fig. 2, and each horizontal bar is connected by horizontal pivots $i^1$, with the corresponding ends of the vertical bars of both pairs which are arranged on the same side of the cylinders and platens. The pintles $j^1$ of each pivot head are preferably connected by a transverse bar $J^2$ on that side of the adjacent pair of vertical bars opposite to the pivot heads, as shown in Figs. 1 and 3. The pivotal connection between each horizontal bar I and the adjacent end of one of the vertical bars H preferably consists of a stud arranged on the end of the horizontal bar and having a cylindrical portion $i^2$ which receives an eye $i^3$ of the vertical bar, a friction washer $i^4$ of leather, fiber or similar material arranged on the outer side of said eye, a screw nut $i^5$ applied to the outer end of the stud and a locking washer $i^6$ interposed between the screw nut and the friction washer, as shown in Fig. 13. The outer or locking washers $i^6$ on the adjacent studs of a pair of horizontal bars are connected by a cross bar $i^7$, as shown in Figs. 6 and 10, which prevents these washers from turning on their studs and thus serve as locking devices which prevent the respective clamping screw nuts from becoming loose on their studs and also as a part of the articulated frame. Upon turning the vertical bars while the pivot heads are held stationary, these bars turn on the pintles $j^1$ which causes the vertical bars of each pair to fold one upon the other in the manner of a parallel ruler, thereby tilting the frame and causing one platen to be offset with reference to the other, whereby the lower platen is rendered more convenient of access, as shown in Fig. 10. This folding movement of the reversible frame is limited by means of stops $h$ each of which is secured to one of the vertical bars and engages against the companion vertical bar, as shown in Fig. 10.

For the purpose of holding the pivot heads stationary and permitting the reversible frame to be folded or tilted, a locking device is provided which is constructed as follows: K, $K^1$ represent locking disks secured to the outer ends of the trunnions and each provided on diametrically opposite sides of its periphery with recesses or notches $k^2$, as shown in Figs. 5 and 9. Below each of these locking disks is arranged a vertically-movable keeper or locking bolt $k^3$ which is guided in a way on the outer part of the adjacent standard and adapted to be engaged with or disengaged from either of the notches of its locking disk. These keepers are operated in unison by a rock shaft $k^4$ journaled lengthwise in the lower rear part of the standards and provided at opposite ends with forwardly projecting rock arms $k^5$, $k^6$ which are connected with the lower ends of the keepers by links $k^7$. The keepers are normally held in their elevated or operative position and in engagement with the locking disks by means of a lever L pivoted on the outer side of the standard $A^2$ and having a weight $l$ on one of its arms while its other arm is connected by a link $l^1$ with the adjacent rock arm $k^6$ of the rock shaft, as shown in Fig. 9. The keepers are depressed and disengaged from the locking disks by means of an upright toggle having its upper and lower members $m$, $m^1$ connected respectively with a bracket $m^2$ on the other standard $A^1$ and the front end of the other rock arm $k^5$. The upper toggle member $m$ is provided with a handle $m^3$. Upon straightening the toggle by moving the same from the position shown in full lines to the position shown in dotted lines, Fig. 5, the keeper rock shaft $k^4$ will be turned for releasing both keepers from the locking disk. Upon moving the toggle forward and breaking the same, the keepers are free to be raised by the weighted lever L into engagement with the locking disks. The turning movement of the toggle in the direction for straightening the same may be arrested by a stop of any suitable construction when the joint between the toggle-members has reached the dead center or passed slightly beyond the same. In order to automatically break the toggle and allow the keepers after they have been disengaged from the locking disks, to reëngage therewith, a shifting arm N is provided. This arm is pivoted at its upper end on the bracket $m^2$ on the outer side of the adjacent locking disk K and is provided at its lower end with a nose or lug $n$ which is arranged in rear of the upper toggle member $m$, as shown in Figs. 5 and 7. The outer side of the locking disk K is provided on diametrically opposite sides with tappets or pins $n^1$ which are adapted to engage with the rear side of the shifting arm N and move the same forwardly. Upon turning the toggle handle $m^3$ so as to straighten the toggle and depress the keepers out of engagement from the locking disks, the upper toggle member $m$ engages with the lug $n$ of the shifting arm N and moves the latter rearwardly until it engages with the adjacent tappet $n^1$, which latter at this time serves as a stop for the toggle, as shown by dotted lines in Fig. 5. Upon turning the reversible frame and the parts connected therewith in the direction of the arrow when the keepers are disengaged from the locking disks in the manner described, the operative tappet $n^1$ moves the shifting arm N forwardly and the latter in turn moves the upper toggle member $m$ forwardly sufficiently to break the toggle, thereby releasing the keepers, allowing the same to automatically reëngage with the periphery of the locking disk and enter the other set of notches of the disks for locking the reversible frame against turning after effecting a half-rotation. While the reversible frame is turning, the same is caused to move uniformly and steadily by a brake device which may be constructed in any suitable manner. The brake device for this purpose shown in the drawings consists of a band O which passes around the upper part of the locking disk $K^1$ and is secured at one end to the adjacent standard $A^2$ while its opposite end is connected to a weighted lever $o^1$ which is pivoted on the same standard, as shown in Fig. 9.

The turning of the vertical frame bars on the pivots $j^1$ for assuming an inclined position and offsetting the platens, as shown in Fig. 10, is effected by means of a driving shaft P which is journaled axially in the right-hand trunnion $j$. This shaft is provided at its inner end with a double crank or duplex arm $p$ arranged parallel with the frame bars H and pivotally connected at its ends by transverse links $p^1$ with the frame bars H above and below the driving shaft, as shown in Figs. 1, 4 and 10.

Q represents a driving gear wheel whereby the reversible frame is operated both for folding or tilting the same into a position for discharging and receiving molding flasks and also for rotating the same to reverse a flask. This wheel is journaled on a bushing $q$ which is keyed to the outer end of the driving shaft P and is oscillated by means of a vertically-reciprocating gear rack $q^1$ which engages with the teeth of the driving wheel. On opposite sides of the driving wheel are arranged two coupling disks $Q^1$ which are keyed to the driving shaft and which engage frictionally with the driving wheel by means of interposed friction washers $q^2$, $q^3$ of fiber or other suitable material. The inner coupling disk $Q^1$ abuts against a shoulder $q^4$ on the driving shaft and the two coupling disks are firmly clamped against opposite sides of the driving wheel by means of a screw bolt $q^5$ entering the outer end of the shaft and a washer $q^6$ interposed between the head of this bolt and the outer coupling disk, as shown in Figs. 1 and 3.

R represents two spring pressed pawls pivoted on opposite sides of the driving wheel and each adapted to engage with either of a pair of notches or recesses $r$ on diametrically opposite sides of the adjacent coupling disk. These notches are provided with abrupt front sides and inclined rear sides whereby the pawls upon engaging with the same cause the coupling disks to move forwardly with the driving wheel but permit the driving wheel to move backwardly independent of the disks.

The gear rack $q^1$ is held in engagement with the driving wheel by means of a guide roller $s$ engaging with the front side of the same. This roller is mounted between two supporting bars $s^1$ which are mounted at their rear ends upon the hubs of the coupling disks while their front ends are supported by an upright stationary rod $s^2$. Various means may be employed for imparting a reciprocating motion to the gear rack but I prefer to operate the same pneumatically. As shown in the drawings, this pneumatic actuating device consists of a piston $t$ having its rod $t^1$ connected with the gear rack and reciprocated in a vertical cylinder T by alternately admitting compressed air into opposite ends of the cylinder and exhausting the same therefrom. The compressed air for this purpose is supplied by a pipe $t^2$ which is connected by a valve mechanism with pipes $t^3$, $t^4$ leading to opposite ends of the cylinder. This valve mechanism, shown in Figs. 5 and 7, consists essentially of a case $t^5$ having an inlet nipple with which the air supply pipe $t^2$ connects, two supply ports $u$, $u^1$ with which the pipes $t^4$, $t^3$ connect, an exhaust port $u^2$ arranged between the supply ports and opening into the atmosphere and a slide valve $u^3$ which alternately connects each supply port with the exhaust port and with the air supply. The valve case is mounted on the bracket $m^2$ and the slide valve $u^3$ is operated by means of a hand lever $u^4$ which is pivoted on the bracket and connected by a rod $u^5$ with the slide valve.

Upon the lower rear part of the base is mounted a stop device which normally arrests the backward movement of the reversible frame when the same assumes a vertically straightened position. This stop device, as shown in the drawings, preferably consists of two dogs V, V which arrest the backward movement of the flask-supporting frame but permits the same to turn forwardly. In addition to serving as a stop for arresting the backward movement of the reversible frame, each of these dogs is combined with a cushioning device for preventing jarring of the machine. Each stop dog, see Fig. 12 is capable of turning and also of sliding lengthwise on a pin $v$ which extends transversely through the bifurcated upper part of a bracket $v^1$ and a longitudinal slot $v^2$ in the dog.

W represents a cushion cylinder or dash pot arranged in rear of each stop dog and pivotally connected on its opposite sides by rods $w$ with opposite ends of the pivot pin $v$ which connects the dog with its supporting bracket.

$w^1$ represents a plunger or piston working in the cushion cylinder and connected by a rod $w^2$ with the rear end of the stop dog. In the normal position of the dog the same is moved forwardly until the rear end of its slot engages with the pivot pin and the plunger is in the front part of the cylinder, this movement being effected by a spring $w^3$ surrounding the rod and interposed between the rear end of the dog and the front end of the cushion cylinder. The backward movement of the dog is resisted by the spring and also by the air which is confined in the rear end of the cylinder. The air is permitted to escape from the rear end of the cylinder, during the backward movement of the plunger through a valve $w^4$ which is arranged in the rear head of the cushion cylinder and whereby the escape of the air and the cushioning effect of the same may be regulated.

In the normal position of the stop dogs, they stand in a rearwardly inclined position with their front ends projecting into the path of the horizontal bars of the reversible frame. The stop dogs are yieldingly held in this position by the weight of the cushion cylinders and connecting parts on the rear end of the dogs and the movement of each dog in this direction is limited by a shoulder or stop $w^5$ which is formed on the rear part of the bracket $v^1$ and which is engaged by the rear end of the stop dog. Upon moving the reversible frame from its tilted or offset position shown in Fig. 10 to its vertically straightened position shown in Fig. 9, the rear longitudinal bar of the lower pressure cylinder strikes the front end of the stop dogs and shifts the same from the position shown in Figs. 10 and 12 to the position shown in Figs. 2 and 9. As the rear lower horizontal bar of the reversible frame strikes the dogs the same recede until the front end of the slots therein engage with their pivot pins. When the dogs reach this position they arrest the backward movement of the reversible frame, this stopping of the frame taking place when the same is in a vertically-straightened position, as shown in Figs. 5, 6 and 9. Upon turning the reversible frame forwardly for reversing the molding flask, the horizontal bars of the upper pressure cylinder strikes the stop dogs and deflect the same and when these bars have passed the dogs the latter again resume their normal operative position.

Preparatory to beginning the molding operation, the attendant retracts both platens into their outermost or separated position by venting the outer ends of the pressure cylinders and locks the pivot heads J, $J^1$ against turning by engaging the keepers with the locking disks, so that the pintles $j^1$ of each head are horizontally in line. The slide valve $u^3$ is then shifted to admit air into the cylinder T underneath its reversing piston whereby the driving wheel Q is turned in the direction of the arrow, Fig. 9. This movement is transmitted from the driving wheel to the adjacent vertical frame bars H through the medium of the intermediate connecting mechanism whereby the articulated reversing frame is shifted into an oblique or folded position and the lower platen is offset from the upper platen as shown in Fig. 10. The folding movement of the reversible frame in this direction is limited at this time by the stops $h$ and the frame is held in this position by the air pressure against the lower side of the actuating piston $t$. The attendant now proceeds with the operation of pressing and reversing a mold as follows: The pattern board $x$ is first placed upon the lower platen with the pattern uppermost, then the flask $y$ is placed upon the pattern board and filled with molding sand, and then the bottom board $z$ is placed on top of the flask. The attendant then shifts the slide valve $u^3$ for admitting air to the upper end of the cylinder T and exhausting the air from the lower end thereof whereby the driving wheel Q is turned backwardly. During this backward movement of the driving wheel, the coupling disks move backwardly with the driving wheel by frictional contact therewith and thereby turn the reversing frame backwardly until the vertical bars assume a vertically straightened position at which time the backward movement of the reversible frame is arrested by the dogs V, as shown in Fig. 9. The attendant now turns the valve F of the lower pressure cylinder to admit air into the outer or lower end of the same, whereby the piston therein is raised, and the molding flask is elevated and pressed by the lower platen against the upper platen, as shown in Fig. 1, thereby ramming the sand in the flask around the pattern. The attendant now releases the pivot heads by straightening the toggle and withdrawing the keepers from the locking disks and then shifts the slide valve $u^3$ to admit air into the lower end of the reversing cylinder whereby the piston therein is moved upwardly and the reversible frame is rotated in a forward direction. During the first part of this forward turning movement of the reversible frame, one of the tappets $u^4$ engages with the shifting arm N which latter in turn engages with the upper member $m$ of the toggle for releasing the keepers and permitting the same to re-engage with the periphery of the locking disks. At the end of one-half turn of the reversible frame the molding flask has been completely reversed and the vertical bars of the frame again stand in a vertical position. The instant the reversible frame reaches this position, the keepers automatically interlock with the other set of notches in the locking disk and hold the pivot heads against turning. During the continued forward movement of the reversible frame, after the pivot heads have been thus locked, the driving shaft turns independently of the pivot heads, whereby the reversible frame is folded obliquely or tilted until the stops $h$ arrest this movement. Just before the reversible frame completes its half-turn, the air valve F of the active pressure cylinder which has now been shifted from the lower part of the machine to the upper part thereof, is automatically turned for cutting off the air supply from the outer end of this cylinder and connecting the same with the atmosphere, which causes the piston in this cylinder to be lifted by the air pressure underneath the same and the platen connected therewith to be raised from the inverted pattern board. By thus lifting the upper platen from the inverted pattern board before the folding of the reversible frame begins, the necessary clearance between the pattern board and the upper platen is produced which permits the finished mold to be moved laterally by the lower platen from underneath the upper platen during the offsetting movement of the reversible frame. When the latter reaches the end of its offsetting movement, the upper platen is out of opposition to the lower platen which permits of conveniently removing from the lower platen the flask containing the finished mold and replacing the same by an empty flask, when the operation is repeated in the manner described.

While the reversible frame is being reversed the same is held in its straightened position by the molding flask which is being pressed between the two platens. During the brief time in which the upper platen is removed from the flask before reaching its completely reversed position, the same is held against the lower platen by centrifugal force, which force together with the friction in the joints between the vertical and horizontal bars of the reversible frame holds the latter in a rectangular position and prevents the same from folding until it has made a half turn and the pivot heads are locked by the keepers.

When the vertical bars reach a vertical position as the frame completes its half-turn movement, the opposing faces of the platens stand in a horizontal position and remain in this position while the platens are being offset. The piston in the reversing cylinder is always moved upwardly and downwardly a full stroke, the extent of this movement being sufficient to turn the reversing frame more than one-half around. During the upward movement of the reversing piston, the coupling pawls R are shifted from the position shown in full lines in Fig. 9 to the position shown in dotted lines in said figure, whereby the reversing frame is turned more than one-half a rotation from the vertical ramming position shown in Fig. 9 to the reversed and folded position shown in Fig. 10. During the downward movement of the reversing piston, the reversible frame is turned backwardly by the frictional contact between the driving wheel and coupling disks until the frame has been shifted from its folded position shown in Fig. 10, to its straightened ramming position shown in Fig. 9, when the backward movement of the frame is arrested by the stop dogs V. After the backward movement of the reversible frame has been thus arrested the driving wheel continues to turn backwardly independent of the coupling disks until the reversing piston reaches the end of its downward stroke. During this independent movement of the driving wheel it slips on the coupling disks and when it reaches the end of its backward movement its coupling pawls are engaged with the diametrically opposite notches of the coupling disks ready to reverse the flask supporting and compressing mechanism.

It will be observed that the driving mechanism for the reversible frame which enables the latter to be turned intermittently forward for reversing and offsetting the platens and moving the same backwardly into a ramming position is very simple, compact and not liable to get out of order.

The relative position of the platens is such that upon elevating the molding flask and pressing the same between the two platens the flask is raised above the horizontal axis of the reversible frame which causes the weight of the flask to aid in reversing the frame, thereby reducing the amount of power necessary for this purpose.

The rotary joint $e^1$ between the fixed and rotary sections of the conduit supplying air to the pressure pistons and the flexible tubes connecting the air supply pipe with opposite ends of the pressure cylinders permits of turning the reversible frame freely and also permits the cylinders to be moved out of alinement from each other without interfering with the air supply to the same. By causing the air to press constantly on the small area or reduced ends of the pressure pistons, the latter are retracted promptly without the use of springs which are liable to get out of order.

It will be observed that during each operation of the machine, the pressure piston and cylinder of one platen are inactive and that the latter merely serves as an abutment for the flask which is rammed against the same by the other active platen.

I claim as my invention:

1. In a molding machine, the combination of a reversible frame, a platen arranged in said frame, a pressure cylinder mounted on said frame in rear of the platen, a piston arranged in the cylinder and connected with the platen by a neck or reduced extension, and conduits connected with opposite ends of the cylinder for supplying a pressure medium thereto, the conduit connecting with the inner end of the cylinder being valveless and the conduit connecting with the outer end of the cylinder having a valve for admitting or shutting off the pressure medium therefrom, substantially as set forth.

2. In a molding machine, the combination of a reversible frame, a pressure cylinder mounted on the frame, a piston arranged in said cylinder and having its inner side of less area than its outer side, a platen connected with the inner side of the piston, a conduit for supplying a pressure medium consisting of a fixed section, a central movable section arranged concentric with the axis of the reversible frame and connected by a rotary joint with the fixed section, inner and outer branch tubes connecting the central section with opposite ends of the cylinder, and a valve arranged in the outer branch tube, substantially as set forth.

3. In a molding machine, the combination of a reversible frame, a platen mounted thereon, a pressure cylinder and piston for actuating said platen, valve mechanism for controlling the admission and exhaust of the pressure fluid from said cylinder, and means for automatically shifting said valve mechanism by the reversal of said frame, substantially as set forth.

4. In a molding machine, the combination of a reversible frame, a pressure cylinder mounted on the frame, a piston arranged in the cylinder and having one of its sides of less area than the other, conduits connected with opposite ends of the cylinder for supplying a pressure medium thereto, a pressure and vent valve arranged in the conduit leading to the cylinder on the large area-side of the piston, and automatic means for shifting said valve to cut off the pressure medium from that end of the cylinder and to vent the same upon reversing the frame, substantially as set forth.

5. In a molding machine, the combination of a reversible frame, a pressure cylinder mounted on the frame, a piston arranged in the cylinder and having one of its sides of less area than the other, conduits connected with opposite ends of the cylinder for supplying a pressure medium thereto, a pressure and vent valve arranged in the conduit leading to the cylinder on the large-area side of the piston, a lever arranged on the plug of said valve and having a hand arm for turning the valve to admit the pressure medium to the respective end of the cylinder and close the vent and a tappet arm for shutting off the pressure medium and opening the vent, and a stop which is engaged by the tappet arm for automatically shifting the valve into the last mentioned position, substantially as set forth.

6. In a molding machine, the combination of a reversible frame, a pressure cylinder mounted on the frame, a piston arranged in the cylinder and having one of its sides of less area than the other, conduits connected with opposite ends of the cylinder for supplying a pressure medium thereto, a pressure and vent valve arranged in the conduit leading to the cylinder on the large-area side of the piston, an arm arranged on the plug of said valve for turning the latter to cut off the pressure medium from the respective end of the cylinder and vent the same, a movable stop which forms an abutment for the said arm during its forward movement for shifting the valve into the last mentioned position but which yields when engaged by the said arm during the backward movement of the same, substantially as set forth.

7. In a molding machine, the combination of a main frame, a reversible frame turning in the main frame, pressure cylinders mounted on diametrically opposite sides of the reversible frame, pistons arranged in said cylinder and having their inner sides of less area than their outer sides, platens connected with the inner sides of the pistons, a supply pipe for a pressure medium consisting of a fixed section, a central longitudinal section connected with the fixed section by a rotary joint and arranged concentric with the axis of the reversible frame, inner and outer branch tubes or conduits connecting the central section with opposite ends of each cylinder, a pressure and vent valve arranged in each outer conduit, an elbow lever connected with the plug of each valve and having a straight handle arm and an offset tappet arm, a stop constructed to be engaged by the tappet arms for shifting the valves to cut off the pressure medium from the outer end of the cylinder and to vent the same, and a bar which is adjustably connected with the main frame and upon which said stop is supported so as to be rigid in one direction but movable in the other direction, substantially as set forth.

8. In a molding machine, the combination of a reversible frame, platens mounted on said frame and arranged to receive a molding flask between them, a locking device for holding said frame against turning, a hand operated shifting mechanism for rendering the locking device inoperative, and an automatic shifting device constructed to render the locking device operative, substantially as set forth.

9. In a molding machine, the combination of a reversible frame, platens mounted on said frame and arranged to receive a molding flask between them, a locking disk turning with said frame and provided in opposite sides with recesses, a locking bolt or keeper constructed to enter either of said recesses, a toggle which is connected with said keeper and which upon being straightened withdraws the keeper from the locking disk, and a tappet mechanism which is operated by the locking disk and which is constructed to break said toggle and permit the keeper to engage the disk, substantially as set forth.

10. In a molding machine, the combination of a reversible frame, platens mounted in said frame and arranged to receive a molding flask between them, a locking disk turning with said frame and provided on opposite sides with recesses, a locking bolt or keeper constructed to enter either of said recesses, a rock arm connected by a link with said keeper, a toggle having one of its members connected with said rock arm and constructed to release the keeper from said disk when in its straightened position, a shifting arm arranged to engage said toggle and break the same for permitting the keeper to engage the disk, and a tappet arranged on the disk and constructed to move the shifting arm for breaking the toggle, substantially as set forth.

11. In a molding machine, the combination of a main frame, a reversible frame provided on opposite sides with horizontal trunnions which are journaled in the main frame, locking disks mounted on said trunnions and each provided in opposite sides with recesses, a keeper arranged adjacent to each of said disks and adapted to enter either of its recesses, a horizontal rock shaft journaled lengthwise in the main frame and having rock arms at opposite ends which are connected by links with said keepers, a weighted lever connected with one of said rock arms for turning the parts in the direction for engaging the keepers with said disks, a toggle having its members connected respectively with the other rock arm and the main frame and adapted when straightened to turn the parts for engaging the keepers with said disks, a shifting arm pivoted at its upper end on the main frame and provided at its lower end with a lug which engages with said toggle, and a tappet arranged on the adjacent disk and adapted to move the shifting arm for breaking the toggle, substantially as set forth.

12. In a molding machine, the combination of a reversible frame, a platen and an opposing abutment both mounted on said frame and adapted to receive a molding flask between them, means for moving the platen and abutment one toward and from the other, and means for moving the platen and abutment out of opposition, substantially as set forth.

13. In a molding machine, the combination of a reversible frame, two platens mounted in said frame and adapted to receive a molding flask between them, means for moving said platens toward and from each other, and means for moving said platens out of opposition, substantially as set forth.

14. In a molding machine, the combination of a carrying frame having articulated members, and a platen and an opposing abutment mounted on said frame and adapted to receive a molding flask between them, the members of said frame being arranged to cause said platen and abutment to move out of opposition when the frame is turned to an abnormal position, substantially as set forth.

15. In a molding machine, the combination of a movable frame consisting of an articulated parallelogram, and a platen and an opposing abutment mounted on said frame and adapted to receive a molding flask between them, substantially as set forth.

16. In a molding machine, the combination of a reversible frame consisting of an articulated parallelogram, and a platen and an opposing abutment mounted on said frame and adapted to receive a molding flask between them, substantially as set forth.

17. In a molding machine, the combination of two platens normally arranged to receive a molding flask between them, and an articulated reversible frame carrying said platens and having normally vertical members arranged on opposite sides of the platens and pivoted centrally to turn in a vertical plane, and horizontal members connected centrally with the respective platens and pivoted at opposite ends to the adjacent ends of the vertical members, substantially as set forth.

18. In a molding machine, the combination of two platens normally arranged to receive a molding flask between them, and an articulated reversible frame for said platens consisting of two pairs of normally vertical bars arranged on opposite sides of the platens, two pairs of horizontal bars each horizontal pair being connected centrally with one of the platens and each horizontal bar being pivoted at its ends to the corresponding ends of two vertical bars, and pivot heads upon which the vertical bars are pivoted at their central portions, substantially as set forth.

19. In a molding machine, the combination of two platens arranged to receive a molding flask between them, an articulated reversible frame for said platens consisting of two pairs of normally vertical bars arranged on opposite sides of the platens, two pairs of horizontal bars, the bars of each pair being connected with one of the platens and each horizontal bar being pivoted at its ends to the corresponding ends of two vertical bars, and two pivot heads upon each of which the central part of a pair of vertical bars is pivoted, means for turning the frame and pivot heads in unison, and means for holding the pivot heads against turning and causing the frame to turn on the pivot heads, substantially as set forth.

20. In a molding machine, the combination of two platens arranged to receive a molding flask between them, an articulated reversible frame for said platens consisting of two pairs of normally vertical bars arranged on opposite sides of the platens, two pairs of horizontal bars, the bars of each horizontal pair being connected with one of the platens and each horizontal bar being pivoted at its ends to the corresponding ends of two vertical bars and two pivot heads upon each of which the central part of a pair of vertical bars is pivoted, and stops for limiting the turning movement of the vertical bars on the pivot heads, substantially as set forth.

21. In a molding machine, the combination of two platens arranged to receive a molding flask between them, an articulated reversible frame for said platens consisting of two pairs of normally vertical bars arranged on opposite sides of the platens and each bar provided at its ends with eyes and two pairs of horizontal bars supporting the platens and each horizontal bar having a screw stem which turns in an eye of one of the vertical bars and a shoulder bearing against one side of said eye, a friction washer arranged on the stem and bearing against the opposite side of said eye, a screw nut applied to the end of said stem, a locking washer interposed between the friction washer and the screw nut, and cross-bars connecting the locking washers of adjacent screw stems, substantially as set forth.

22. In a molding machine, the combination of two platens arranged to receive a molding flask between them, an articulated reversible frame for said platens consisting of two pairs of normally vertical bars arranged on opposite sides of the platens, two pairs of horizontal bars, the bars of each horizontal pair being connected with one of the platens and each horizontal bar being pivoted at its ends to the corresponding ends of two vertical bars and two pivot heads each of which pivotally supports the central part of one pair of vertical bars and is provided with a trunnion, means for holding said trunnion against turning, and a shaft journaled in the trunnion of one pivot head and a crank or arm arranged on said shaft and connected with one or more of said vertical bars, substantially as set forth.

23. In a molding machine, the combination of two platens arranged to receive a molding flask between them, an articulated reversible frame for said platens consisting of two pairs of normally vertical bars arranged on opposite sides of the platens, two pairs of horizontal bars, the bars of each horizontal pair being connected with one of the platens and each horizontal bar being pivoted at its ends to the corresponding ends of two vertical bars and two pivot heads each of which pivotally supports the central part of one pair of vertical bars and is provided with a trunnion, a locking disk secured to each trunnion, keepers constructed to engage said disks and hold the pivot heads against turning, a shaft journaled in one of said trunnions and provided with crank arms at one end, links connecting said arms with the adjacent vertical bars, and means for turning said shaft, substantially as set forth.

24. In a molding machine, the combination of two platens arranged to receive a molding flask between them, an articulated reversible frame for said platens consisting of two pairs of normally vertical bars arranged on opposite sides of the platens, two pairs of horizontal bars, the bars of each horizontal pair being connected with one of the platens and each horizontal bar being pivoted at its ends to the corresponding ends of two vertical bars and two pivot heads upon each of which the central part of a pair of vertical bars is pivoted, a driving wheel for turning the reversible frame, a positive connection between said driving wheel and the reversible frame for turning the latter in one direction, and a frictional connection between said driving wheel and reversible frame for turning the latter in the opposite direction, substantially as set forth.

25. In a molding machine, the combination of two platens arranged to receive a molding flask between them, an articulated or reversible frame for said platens consisting of two pairs of normally vertical bars arranged on opposite sides of the platens, two pairs of horizontal bars, the bars of each horizontal pair being connected with one of the platens and each horizontal bar being pivoted at its ends to the corresponding ends of two vertical bars and two pivot heads upon which the central part of a pair of vertical bars is pivoted and each of which is provided with a trunnion, means for holding said trunnions against turning, a shaft journaled in one of said trunnions and having arms connected with the adjacent vertical bars, an oscillating driving wheel mounted loosely on said shaft, and a ratchet coupling connecting the driving wheel and shaft and constructed to compel the shaft to turn forwardly with the driving wheel but to permit the latter to turn backwardly independently of said shaft, substantially as set forth.

26. In a molding machine, the combination of two platens arranged to receive a molding flask between them, an articulated reversible frame for said platens consisting of two pairs of normally vertical bars arranged on opposite sides of the platens, two pairs of horizontal bars, the bars of each horizontal pair being connected with one of the platens and each horizontal bar being pivoted at its ends to the corresponding ends of two vertical bars and two pivot heads upon which the central part of a pair of vertical bars is pivoted and each of which is provided with a trunnion, means for holding the trunnions against turning, a shaft journaled in one of said trunnions and having arms connected with the adjacent vertical bars, an oscillating driving wheel mounted loosely on said shaft, coupling disks secured on said shaft and bearing frictionally against opposite sides of the driving wheel and each disk having recesses on diametrically opposite sides, and pawls mounted on the driving wheel and each constructed to engage either of the recesses in one of the disks, substantially as set forth.

27. In a molding machine, the combination of two platens arranged to receive a molding flask between them, two pressure cylinders arranged one in rear of each platen, pistons arranged in the cylinder and connected with the platens, and an articulated reversible frame consisting of two pairs of normally vertical bars arranged on opposite sides of the platens and cylinders, two pairs of horizontal bars pivoted at their ends to the corresponding ends of the vertical bars and each pair of horizontal bars connected with one of the pressure cylinders, and rotatable heads upon which the central parts of the vertical bars are pivoted, substantially as set forth.

28. In a molding machine, the combination of two platens arranged to receive a molding flask between them, two pressure cylinders arranged one in rear of each platen, pistons arranged in the cylinders and connected with the platens, an articulated reversible frame consisting of two pairs of normally vertical bars arranged on opposite sides of the platens and cylinders, two pairs of horizontal bars pivoted at their ends to the corresponding ends of the vertical bars and each pair of horizontal bars connected with one of the pressure cylinders, and rotatable heads upon which the central parts of the vertical bars are pivoted, and a conduit for supplying a pressure medium mounted on said frame and having flexible branches which connect with opposite ends of the cylinders, substantially as set forth.

29. In a molding machine, the combination of a reversible frame provided with means for supporting a molding flask, a stop device constructed to permit the frame to turn in one direction but to prevent the same from turning in the other direction, and a cushioning device which is applied to said stop device and which yieldingly holds the stop device in its projected position, substantially as set forth.

30. In a molding machine, the combination of a reversible frame provided with means for supporting a molding flask, a stop dog for arresting the backward movement of said frame having a longitudinal slot, a bracket provided with a pin passing through said slot, and a spring for holding the stop dog yieldingly in its projected position, substantially as set forth.

31. In a molding machine, the combination of a reversible frame provided with means for supporting a molding flask, a stop dog for arresting the backward movement of said frame having a longitudinal slot, a bracket provided with a pin passing through said slot, a cylinder connected with said pin and having a vent in its rear end, a piston arranged in the cylinder and connected with the stop dog, and a spring interposed between said dog and cylinder, substantially as set forth.

32. In a molding machine, the combination of two platens arranged to receive a molding flask between them, an articulated reversible frame for said platens consisting of two pairs of normally vertical bars arranged on opposite sides of the platens, two pairs of horizontal bars, the bars of each horizontal pair being connected with one of the platens and each horizontal bar being pivoted at its ends to the corresponding ends of two vertical bars and two pivot heads upon each of which the central part of a pair of vertical bars is pivoted and each of which is provided with a trunnion, locking disks secured to said trunnions, keepers constructed to engage said locking disks, a brake band applied to one of the locking disks and fastened at one end to a rigid support, and a weight lever connected with the opposite end of said band, substantially as set forth.

33. In a molding machine, the combination of two platens arranged to receive a molding flask between them, an articulated reversible frame for said platens consisting of two pairs of normally vertical bars arranged on opposite sides of the platens, two pairs of horizontal bars, the bars of each horizontal pair being connected with one of the platens and each horizontal bar being pivoted at its ends to the corresponding ends of two vertical bars, and two pivot heads upon each of which the central part of a pair of vertical bars is pivoted and each of which is provided with a trunnion, locking disks secured to said trunnions, keepers constructed to engage said locking disks, a shaft journaled in one of said trunnions and having arms connected with the adjacent vertical bars, a driving gear wheel mounted on said shaft, coupling disks secured to said shaft and bearing against opposite sides of the driving wheel, coupling pawls arranged on the driving wheel and engaging with the coupling disks, a gear rack meshing with the driving wheel, an operating cylinder containing a piston connected with the gear rack, a guide roller bearing against the back of the gear rack, and supporting bars carrying said roller and mounted at one end on the hubs of the coupling disks and at their opposite ends on a supporting rod, substantially as set forth.

Witness my hand this 29th day of July, 1902.

JOHN H. B. BRYAN.

Witnesses:
J. D. SQUIRES,
W. B. JENNINGS.